United States Patent
Shen (10) Patent No.: US 9,722,666 B2
(45) Date of Patent: Aug. 1, 2017

(54) POWER LINE TRANSMISSION SYSTEM AND METHOD

(71) Applicant: Wistron NeWeb Corp., Hsinchu (TW)

(72) Inventor: Sheng-Kun Shen, Hsinchu (TW)

(73) Assignee: Wistron Neweb Corp., Hsinchu (TW)

( * ) Notice: Subject to any disclaimer, the term of this patent is extended or adjusted under 35 U.S.C. 154(b) by 102 days.

(21) Appl. No.: 14/838,061

(22) Filed: Aug. 27, 2015

(65) Prior Publication Data

US 2016/0173167 A1 Jun. 16, 2016

(30) Foreign Application Priority Data

Dec. 11, 2014 (TW) .............................. 103143211 A (51) Int. Cl.
*H04L 12/26* (2006.01)
*H04B 3/56* (2006.01)

(52) U.S. Cl.
CPC ............... *H04B 3/56* (2013.01); *H04L 43/16* (2013.01); *H04B 2203/5441* (2013.01)

(58) Field of Classification Search
None
See application file for complete search history.

(56) References Cited

U.S. PATENT DOCUMENTS

| | | | | |
|---|---|---|---|---|
| 2011/0051721 A1* | 3/2011 | Brothwell | ................ | H04B 3/54 370/353 |
| 2011/0140911 A1* | 6/2011 | Pant | ....................... | H04B 3/546 340/870.02 |
| 2013/0027219 A1* | 1/2013 | Myoung | ................... | H04Q 9/00 340/870.03 |
| 2014/0226977 A1* | 8/2014 | Jovicic | ................. | H04B 10/116 398/26 |
| 2015/0372718 A1* | 12/2015 | McConnell | ............ | H04B 3/544 375/257 |

FOREIGN PATENT DOCUMENTS

| | | |
|---|---|---|
| TW | 201015889 A | 4/2010 |
| TW | 201325115 A | 6/2013 |
| TW | I415358 B | 11/2013 |
| TW | I444081 B | 7/2014 |

* cited by examiner

*Primary Examiner* — Kodzovi Acolatse
(74) *Attorney, Agent, or Firm* — Muncy, Geissler, Olds & Lowe, P.C.

(57) ABSTRACT

A power line method and system are provided. The power line transmission method is applicable to a power line network, where the power line network includes a main power line device configured to connect a cable network, and a plurality of slave power line devices configured to receive the power line network provided by the main power line device. The power line transmission method includes the steps of selecting an agent device from the slave power line devices located in a section where the power line network is broken and maintaining the power line network by connecting the slave power line devices located in the non-broken section of the power line network to the agent device through a wireless network function provided by the agent device.

14 Claims, 6 Drawing Sheets

|   | M | A | B | C | D | E | F | G |
|---|---|---|---|---|---|---|---|---|
| M |   |   |   |   |   |   |   |   |
| A | -30 |   |   |   |   |   |   |   |
| B | -35 | -40 |   |   |   |   |   |   |
| C | -90 | -30 | -40 |   |   |   |   |   |
| D | X | -55 | -60 | -45 |   |   |   |   |
| E | -85 | -80 | -35 | -45 | -40 |   |   |   |
| F | -60 | -80 | -30 | X | X | -45 |   |   |
| G | X | X | X | X | X | X | -65 |   |

POWER LINE TRANSMISSION SYSTEM AND METHOD

CROSS REFERENCE TO RELATED APPLICATIONS

This Application claims priority of TW Patent Application No. 103143211 filed on Dec. 11, 2014, the entirety of which is incorporated by reference herein.

BACKGROUND OF THE INVENTION

Field of the Invention

The invention generally relates to power line transmission technology, and more particularly to power line transmission technology for maintaining a power line network by the wireless network function of provided by the power line device.

Description of the Related Art

Power Line Communication (PLC) transmits signals by using a power line as a channel for transmitting information. It transmits high-frequency signals through the power line, where the high-frequency signals which carry the information are loaded on the current and transmitted by the power line. Then, the high-frequency signals are demodulated from the current by the demodulator.

Power Line Communication technology was consistently and rapidly introduced to the consumer market to support transmission between a home network and other local networks. Computers at home can transmit communication signals through a Power Line network, where the transmission frequency applied to transmitting the communication signal is different from the transmission frequency of a general power transmission. Other electronic devices can also adopt similar methods to transmit data through Power Line networks. For example, home communication devices like phones, video devices, home security devices, monitoring devices, and so on, can be connected through the Power Line technology to share the Power Line network.

However, when the Power Line network is interfered with by electrical appliances, it worsens the quality of the Power Line network. This degraded Power Line network may become broken, causing a negative user experience. Therefore, how to maintain the stability of a Power Line network to avoid breaking it is a subject worthy of discussion.

BRIEF SUMMARY OF THE INVENTION

A power line transmission system and a method are provided to maintain the operation of a power line network by the wireless network function of the power line device.

An embodiment of the present invention provides a power line transmission method. The power line transmission method is applicable to a power line network, where the power line network includes a main power line device configured to connect to a cable network, and a plurality of slave power line devices configured to receive the power line network provided by the main power line device. The power line transmission method includes the steps of selecting an agent device from the slave power line devices located in a section where the power line network is broken, and maintaining the power line network by connecting the slave power line devices located in the non-broken section of the power line network to the agent device through a wireless network function provided by the agent device.

An embodiment of the present invention provides a power line transmission system. The power line transmission system is applicable to a power line network. The power line transmission system includes a main power line device and a plurality of slave power line devices. The main power line device is configured to connect to a cable network. The plurality of slave power line devices are configured to receive the power line network provided by the main power line device. The main power line device and each of the slave power line devices includes a wireless transmission device, a processor and a power line network device. The power line network device is configured to receive the power line network. When a section of the power line network is broken, the processor is configured to select an agent device from the slave power line devices located in the broken section. The slave power line devices located in the broken section maintain the power line network to operate normally by the wireless transmission devices of the slave power line devices located in the non-broken section of the power line network through the wireless transmission device provided by the agent device.

Other aspects and features of the present invention will become apparent to those with ordinary skill in the art upon review of the following descriptions of specific embodiments of power line transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the present invention. This description is made for the purpose of illustrating the general principles of the present invention and should not be taken in a limiting sense. The scope of the present invention is best determined by reference to the appended claims.

Figure 1:
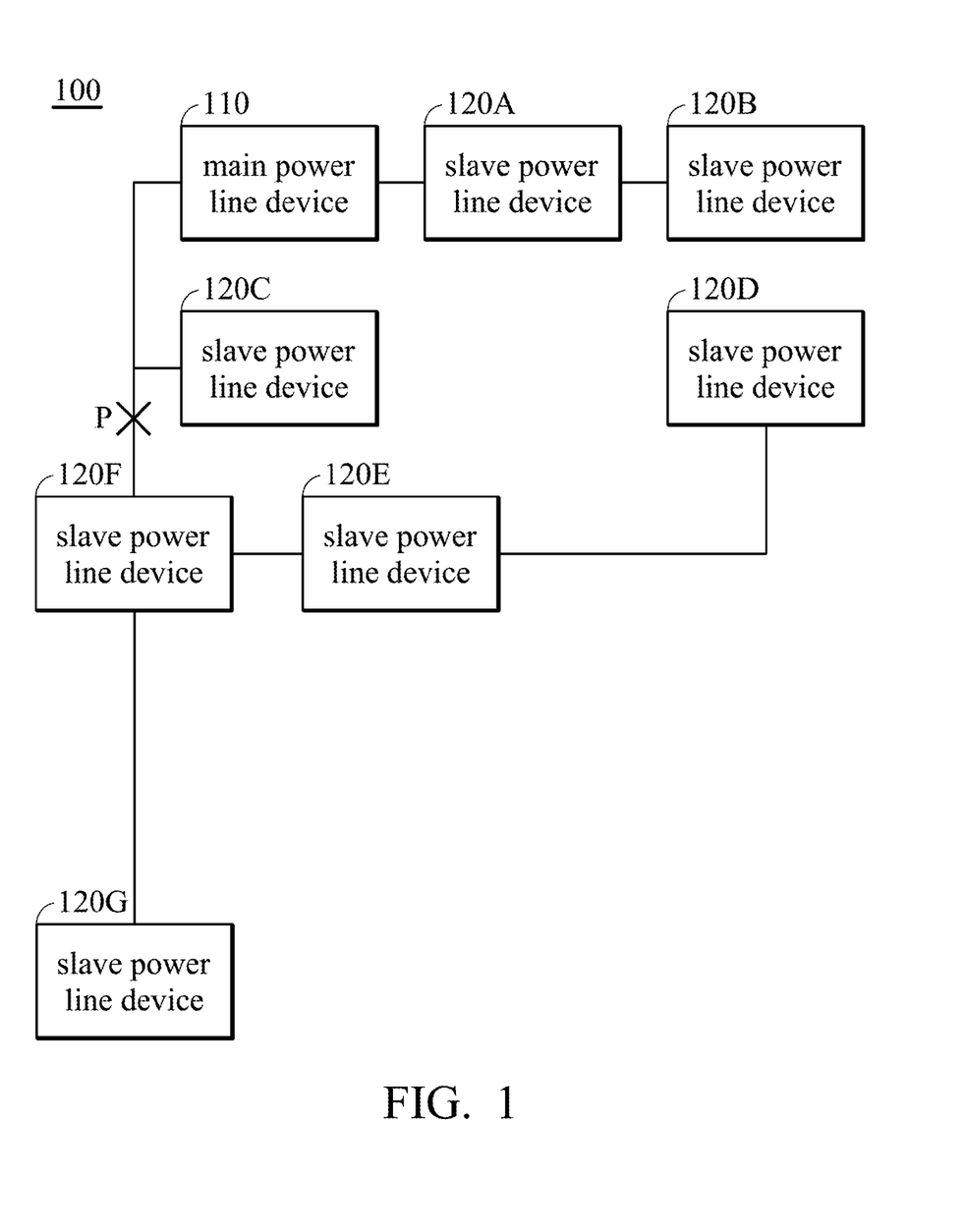
FIG. 1 is a block diagram of a power line transmission system 100 according to an embodiment of the present invention.

FIG. 1 is a block diagram of a power line transmission system 100 according to an embodiment of the present invention. As shown in FIG. 1, in an embodiment of the present invention, the power line transmission system 100 includes a main power line device 110 and slave power line devices 120A-120G. Note that FIG. 1 presents a simplified block diagram in which only the elements relevant to the present invention are shown. Nevertheless, the present invention should not be limited to what is shown in FIG. 1. The power line transmission system 100 may also include different numbers of power line devices, and configurations of the power line devices may also be variable.

Figure 2:
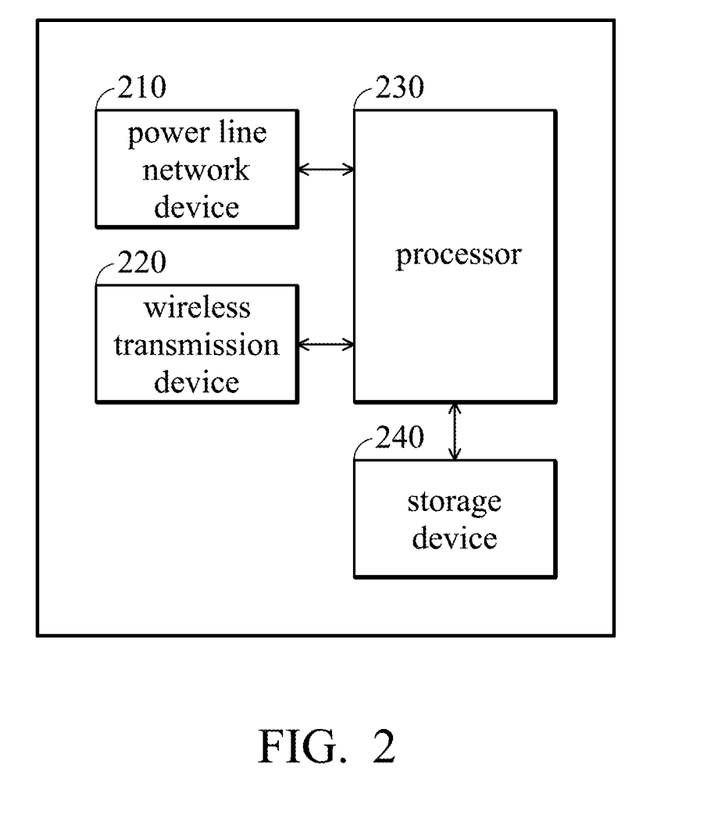
FIG. 2 is a block diagram of a power line device according to an embodiment of the present invention.

FIG. 2 is a block diagram of a power line device according to an embodiment of the present invention. The power line devices (e.g. the main power line device 110 and the slave power line devices 120A-120G) may include a power line network device 210, a wireless transmission device 220, a processor 230 and a storage device 240. Note that the main power line device 110 and the slave power line devices 120A-120G can be regarded as same power line devices. The elements of the main power line device 110 and the slave power line devices 120A-120G can be applied to the embodiments of the present invention. According to the embodiments of the present invention, the main power line device and the slave power line device classified from the power line devices are only for illustration. In addition, the elements of all power line devices of the embodiments are indicated by the same labels (e.g. the power line network device 210, the wireless transmission device 220, the processor 230 and the storage device 240) are only for illustration, and it does not mean that the operation of the embodiments of the present invention should be performed by specific power line devices.

According to an embodiment of the present invention, the main power line device 110 and each of the slave power line devices 120A-120G may be regarded as a network bridge with Wi-Fi transmission function. The main power line device 110 and the slave power line devices 120A-1.20G can provide the power line network to different electronic devices through power line or Wi-Fi transmission by the power line network device 210 or the wireless transmission device 220, respectively.

The power line network device 210 of the main power line device 110 has a cable (wire) network connection port, such as an Asymmetric Digital Subscriber Line (ADSL) network. After the power line network device 210 of the main power line device 110 is connected to cable network, the power line network device 210 may provide power line network to the electronic devices connected along the power line. That is to say, when the slave power line devices 120A-120G receive power line network provided by the main power line device 110, the slave power line devices 120A-120G will be able to process power line transmission.

Figure 3:
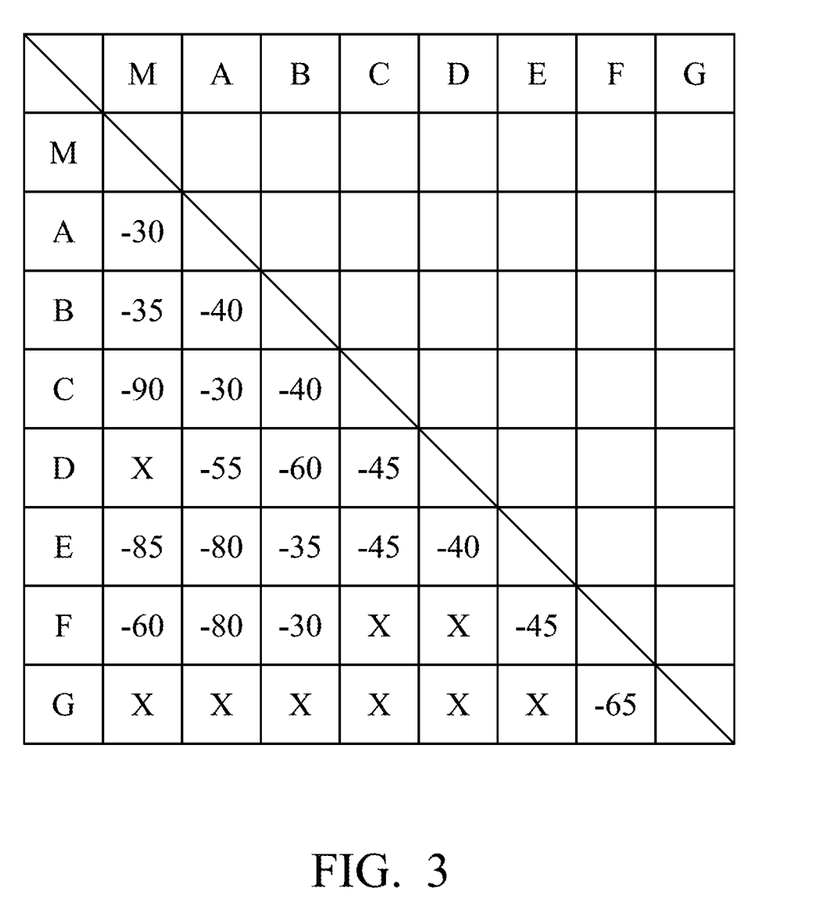
FIG. 3 is a schematic diagram of an RSSI table according to an embodiment of the present invention.

According to an embodiment of the present invention, a Received Signal Strength Indicator table (RSSI table) can be stored in the storage device 240 of the main power line device 110 and each of the slave power line devices 120A-120G, in which the RSSI table is configured to record the RSSI values between the power line devices for transmission through wireless network. FIG. 3 is a schematic diagram of an RSSI table according to an embodiment of the present invention, where M is regarded as the main power line device 110, A~G are regarded as the slave power line devices 120A-120G, and X means there is no signal between the power line devices. As shown in FIG. 3, each power line device can obtain the RSSI values between the power line devices according to the RSSI table. Note that the RSSI values in FIG. 3 are shown only for illustration. The RSSI values between the power line devices may be different according to the environment of the wireless network.

According to an embodiment of the present invention, the processor 230 of each power line device (e.g. the main power line device 110 and the slave power line devices 120A-120G) may classify the slave power line devices 120A-120G to different groups according to the RSSI table, in which each group corresponds to a priority. Firstly, the processor 230 determines whether each RSSI values between each of the slave power line devices 120A-120G and the main power line device 110 is larger than a threshold. If the RSSI value is larger than the threshold, the processor 230 will classify the slave power line device(s) corresponding to the RSSI value to a group having a first priority, namely Group 1, that is, this group has the highest priority. After selecting the slave power line devices into Group 1, the processor 230 may determine whether the RSSI values between the remaining slave power line devices and the slave power line devices of Group 1 are larger than the threshold. If the RSSI value between one of the remaining slave power line devices and one of the slave power line devices of Group 1 is larger than a threshold, the processor 230 may classify the slave power line device to a group having a second priority, namely Group 2 according to the corresponding RSSI values. The first priority is higher than the second priority, i.e. the group classified first has a higher priority. The processor 230 will then classify the remaining slave power line devices accordingly. If the processor 230 has completed the classification of the slave power line devices according the above method, but one device slave power line device (or part of the slave power line devices) is still not classified, because the RSSI values between this slave power line device and other slave power line devices are all lower than the threshold, this device will be classified to a group having the lowest priority, namely Group 0, by the processor 230.

Taking FIG. 3 as an example, if the threshold is set to −50 dBm, for the RSSI values between each of the slave power line devices 120A-120G and the main power line device 110, only the RSSI values corresponding to the slave power line devices 120A (−30 dBm) and the slave power line devices 120B (−35 dBm) are larger than the threshold. Therefore, the slave power line devices 120A and the slave power line devices 120B will be classified to Group 1, and their RSSI values −30 dBm and −35 dBm will be respectively recorded as the corresponding RSSI value of the slave power line devices 120A and the slave power line devices 120B in Group 1.

After selecting the slave power line devices of Group 1, the processor 230 may determine whether the RSSI values between the remaining slave power line devices 120C-120G and the slave power line devices 120A-120B of the Group 1 are larger than the threshold. After determining whether the RSSI values between the remaining slave power line devices 120C-120G and the slave power line devices 120A-120B of the Group 1 are larger than the threshold, only the RSSI values corresponding to the slave power line devices 120C (−30 dBm between the slave power line devices 120C and 120A, −40 dBm between the slave power line devices 120C and 120B, respectively), 120E (−30 dBm between the slave power line devices 120E and 120B) and 120F (−30 dBm between the slave power line devices 120F and 120B) are larger than the threshold. Therefore, the slave power line devices 120B, 120E and 120F will be classified to Group 2. Note that when the number of the RSSI values (above the threshold) corresponding to the slave power line device of one group is more than one, the maximum RSSI value will be selected from those RSSI values by the processor 230, and the selected RSSI value will then be as the corresponding RSSI value of the slave power line device of the group. Taking the slave power line device 120 C as an example, two RSSI values (−30 and −40 dBm) are larger than the threshold. The RSSI value of −30 dBm will be selected from those RSSI values by the processor 230, and the selected RSSI value −30 dBm will then be as the corresponding RSSI value of the slave power line device 120 C of Group B.

After selecting the slave power line devices to Group 2, the processor 230 may determine whether the RSSI values between the remaining slave power line devices 120D and 120G and the slave power line devices 120B, 120E and 120F of Group 2 are larger than the threshold. After determining, only the corresponding RSSI value between the slave power line devices 120D and those of group 2 (−45 dBm between the slave power line devices 120D and 120C, −40 dBm between the slave power line devices 120D and 120E) is larger than the threshold. Therefore, the slave power line device 120D will be classified to the Group 3 and the RSSI value −40 dBm will be as the corresponding RSSI value of the slave power line device 120D of Group 3.

In addition, because all corresponding RSSI values between the slave power line device 120G and other slave power line devices are lower than the threshold, the slave power line device 120G classified to Group 0 by the processor 230 accordingly.

According to an embodiment of the present invention, when a section of the power line network is broken and forms an open circuit, a slave power line device included in the group having the highest priority the largest RSSI value will be selected as an agent device from the slave power line devices by the processors 230 of the slave power line devices located in the broken section will select. As shown in FIG. 1, when the power line network is broken at point P and forms an open circuit, the processors 230 of the slave power line devices 120D, 120E, 120F and 120G located in the broken section will select a slave power line device included in the group having the highest priority and the largest RSSI value as an agent device from the slave power line devices 120D, 120E, 120F and 120G located in the broken section. The slave power line devices 120D, 120E, 120F and 120G correspond to Group 2 (120E, 120F), Group 3 (120D) and Group 0 (120G) respectively. Therefore, the processors 230 may select the slave power line device which has the largest RSSI value as an agent device from Group 2 which has higher priority while compared to group 3 and 0. Therefore, the processors 230 will select the slave power line device 120F to be the agent device. It is worth to be mentioned that, when selecting the slave power line device which has the largest RSSI value as the agent device from the group having the highest priority and the number of the selected slave power line devices is more than one, one of the slave power line devices having the largest RSSI value will be randomly selected by the processors 230 to be the agent device. For example, when the slave power line device having the largest RSSI value is selected from Group 2 by the processors 230 to be the agent device, and if the slave power line devices 120E and 120F have the same RSSI value, one of the slave power line devices 120E and 120F will randomly selected to be the agent device by the processors 230. According to an embodiment of the present invention, when selecting the agent device, the slave power line device whose corresponding RSSI values to other slave power line devices in the broken section are all lower than the threshold (i.e. the slave power line device of the Group 0) will be excluded from the candidate list of being the agent device. Taking FIG. 1 for example, when the power line network is broken at point P, the power line devices in the broken section will exclude the slave power line device 120G from the candidate list of being the agent device.

When the agent device is selected, the agent device will maintain the power line network with the power line devices in the non-broken section of the power line network through wireless transmission of the wireless transmission device 220 of the agent device. More specifically, the agent device will then remain connected with the wireless transmission device 220 of the slave power line device via the wireless transmission device 220, where the slave power line device corresponds to the corresponding RSSI value of the agent device recorded in the group. Taking FIG. 1 as an example, if the slave power line device 120F is the agent device, the slave power line device 120F will remain connected with the wireless transmission device 220 of the slave power line device 120B through its wireless transmission device 220. Additionally, the slave power line device 120B corresponds to the corresponding RSSI value (−30 dBm) of the slave power line device 120F, which is recorded in Group 2. That is to say, the agent device may maintain the operation of the power line network by linking to the power line device in the group having higher priority. The slave power line devices in the broken section of the power line network will be able to maintain the operation of the power line network by the agent device which wirelessly links to the power line device in the non-broken section of the power line network through wireless transmitting.

When the broken section of the power line network is recovered, the linkage established by the wireless transmission device 220 of the agent device will be terminated, and the original power line network provided by the power line network device 210 will then be recovered.

Figure 4:
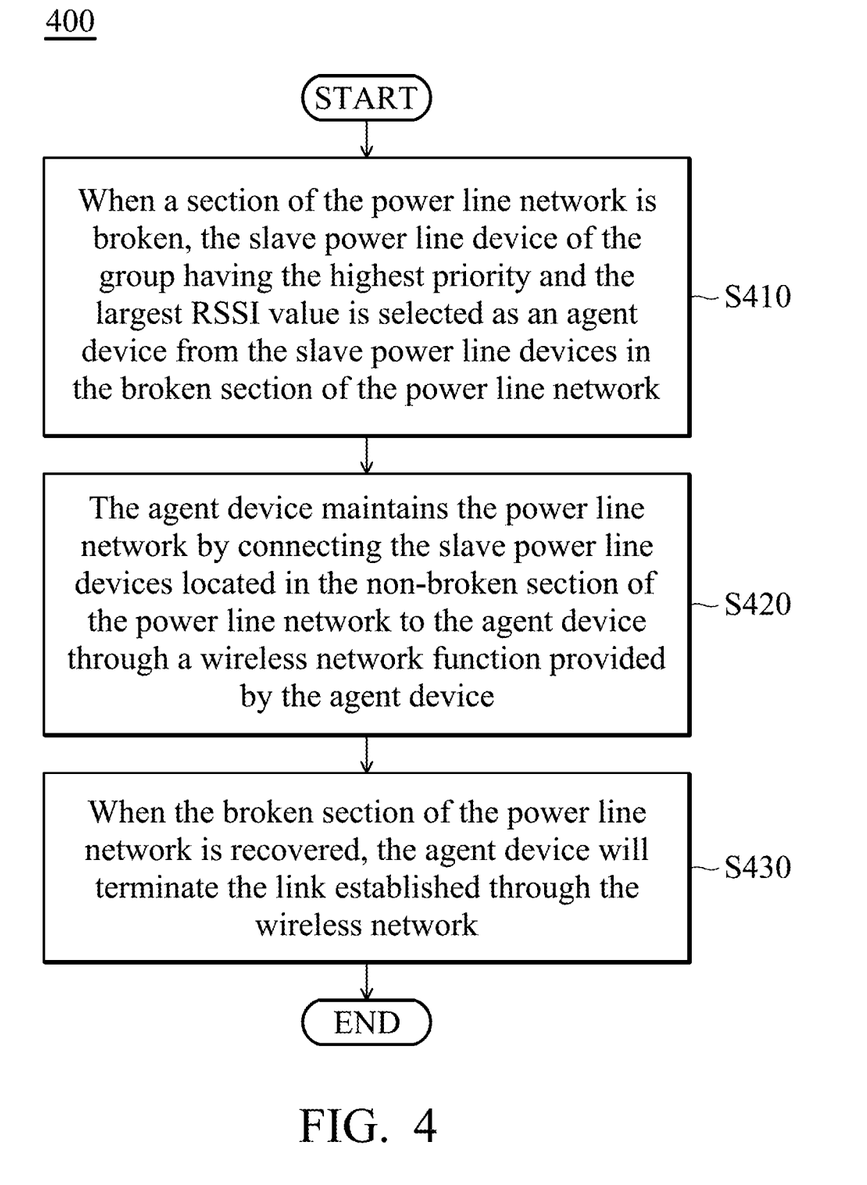
FIG. 4 is a flow chart 400 illustrating a power line transmission method according to an embodiment of the present invention.

FIG. 4 is a flow chart 400 illustrating a power line transmission method according to an embodiment of the present invention. The power line transmission method is applied to the power line transmission system 100. As shown in FIG. 4, in step S410, when a section of the power line network is broken, the slave power line device of the group having the highest priority and the largest RSSI value is selected as an agent device from the slave power line devices in the broken section of the power line network. In step S420, the agent device maintains the power line network by connecting the slave power line devices located in the non-broken section of the power line network to the agent device through a wireless network function provided by the agent device. In step S430, when the broken section of the power line network is recovered, the agent device will terminate the link established through the wireless network.

According to an embodiment of the present invention, the power line transmission method further includes a step: when selecting the agent device, the slave power line devices located in the broken section having all corresponding RSSI values lower than the threshold will first be excluded from the candidate list of the agent device among the power line devices.

Figure 5:
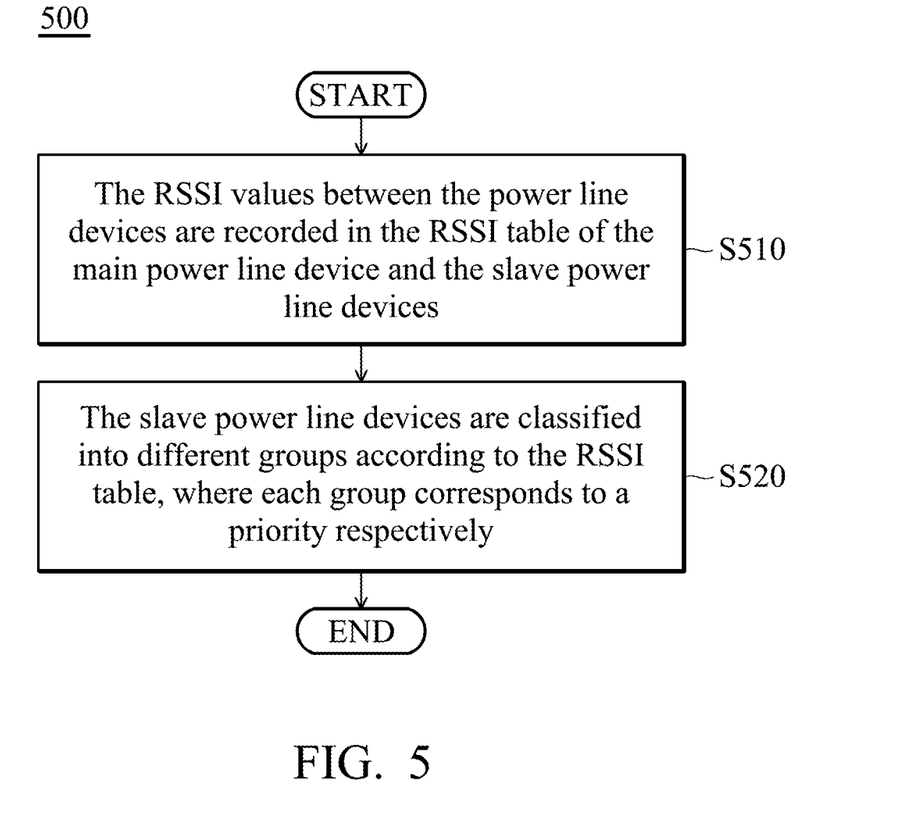
FIG. 5 is a flow chart 400 illustrating a method of classifying the slave power line devices to different groups according to an embodiment of the present invention.

FIG. 5 is a flow chart 400 illustrating a method of classifying the slave power line devices to different groups according to an embodiment of the present invention. The method is applied to the power line transmission system 100. As shown in FIG. 5, in step S510, the RSSI values between the power line devices are recorded in the RSSI table of the main power line device and the slave power line devices. In step S520, the slave power line devices are classified into different groups according to the RSSI table, where each group corresponds to a priority respectively.

Figure 6:
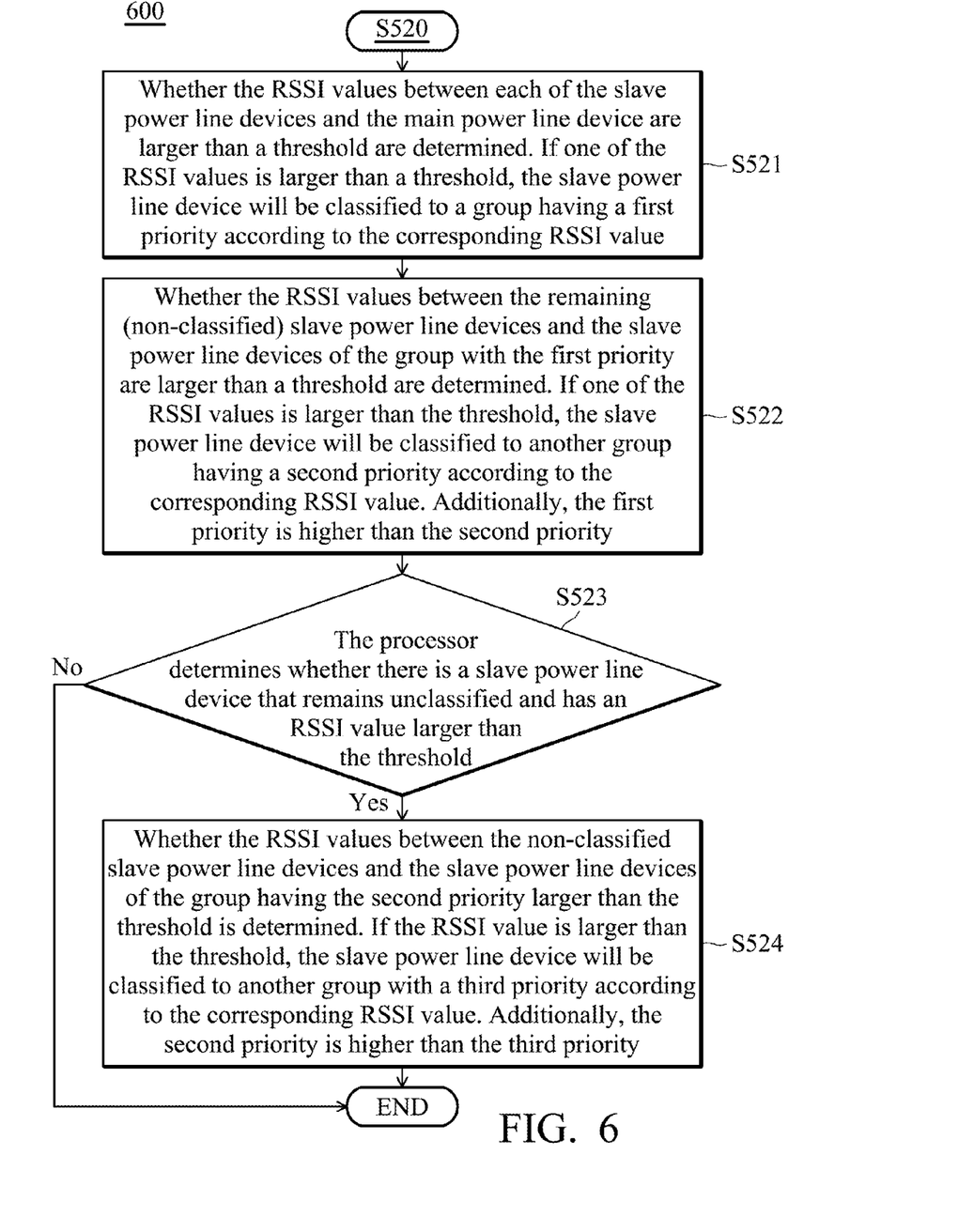
FIG. 6 is a flow chart 600 illustrating step S520 according to an embodiment of the present invention.

FIG. 6 is a flow chart 600 illustrating step S520 according to an embodiment of the present invention. As shown in FIG. 6, in step S521, whether the RSSI values between each of the slave power line devices and the main power line device are larger than a threshold are determined. If one of the RSSI values is larger than a threshold, the slave power line device will be classified to a group having a first priority according to the corresponding RSSI value. In step S522, whether the RSSI values between the remaining (non-classified) slave power line devices and the slave power line devices of the group with the first priority are larger than a threshold are determined. If one of the RSSI values is larger than the threshold, the slave power line device will be classified to another group having a second priority according to the corresponding RSSI value. Additionally, the first priority is higher than the second priority. In step S523, the processor determines whether there is a slave power line device that remains unclassified and has an RSSI value larger than the threshold. If there is a slave power line device which is not yet classified, then step S524 will be performed. In step S524, whether the RSSI values between the non-classified slave power line devices and the slave power line devices of the group having the second priority larger than the threshold is determined. If the RSSI value is larger than the threshold, the slave power line device will be classified to another group with a third priority according to the corresponding RSSI value. Additionally, the second priority is higher than the third priority. In this embodiment, only three groups are classified for illustration. Nonetheless, the present invention should not be limited thereto. If there are slave power line devices which are not classified, the method will perform the same steps accordingly until all slave power line devices are classified.

For the power line transmission method of the present invention, when the power line network is interfered by, for instance, electric appliances, the power line network will be broken, and the power line network will be maintained in a normal status through wireless network provided by the power line devices in the broken section of the power line network. When the broken section of the power line network is recovered, the power line device will be switched back to the original power line transmission pathway. Therefore, by using the power line transmission method of the present invention, breakage of the power line network will be avoided while the power line network is interfered by electric appliances. The operation of the power line network remains normally.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may include a computer-readable medium comprising codes relating to one or more of the aspects of the disclosure. In some aspects a computer program product may include packaging materials.

The above paragraphs describe many aspects. Obviously, the teaching of the present invention can be accomplished by many methods, and any specific configurations or functions in the disclosed embodiments only present a representative condition. Those who are skilled in this technology will understand that all of the disclosed aspects in the present invention can be applied independently or be incorporated.

While the present invention has been described by way of example and in terms of preferred embodiment, it is to be understood that the present invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A power line transmission method applicable to a power line network, the power line network comprising a main power line device configured to connect to a cable network, and a plurality of slave power line devices configured to receive the power line network provided by the main power line device, wherein the main power line device and each of the slave power line devices has a Received Signal Strength Indicator (RSSI) table to record RSSI values between the power line devices, the method comprising:
   classifying the slave power line devices into different groups according to the RSSI table, wherein each of the groups has a corresponding priority;
   selecting the slave power line device from the group having the highest priority and the largest RSSI value to be an agent device among the slave power line devices located in a broken section; and
   maintaining the power line network by connecting the slave power line devices located in the non-broken section of the power line network to the agent device through a wireless network function provided by the agent device.

2. The power line transmission method of claim 1, further comprising:
   determining whether the RSSI value between the slave power line device and the main power line device is larger than a threshold; and
   classifying the slave power line device to the group having a first priority when the RSSI value is larger than the threshold.

3. The power line transmission method of claim 2, further comprising:
   determining whether the RSSI value between the slave power line device not classified and the slave power line device comprised in the group having the first priority is larger than the threshold; and
   classifying the slave power line device not classified to the group having a second priority when the RSSI value is larger than the threshold.

4. The power line transmission method of claim 3, further comprising:
   excluding the slave power line device having RSSI values in the RSSI table smaller than the threshold to be the agent device when selecting the agent device.

5. The power line transmission method of claim 1, further comprising:
   terminating the wireless network function of the agent device when the broken section of the power line network is recovered.

6. A power line transmission system applicable to a power line network, comprising:
   a main power line device configured to connect to a cable network; and
   a plurality of slave power line devices configured to receive the power line network provided by the main power line device,
   wherein the main power line device and each of the slave power line devices comprises a wireless transmission device, a processor, and a power line network device, wherein the power line network device is configured to receive the power line network and when a section of the power line network is broken, the processor is configured to select an agent device from the slave power line devices located in the broken section, and the slave power line devices located in the broken section maintain the power line network to operate normally by the wireless transmission devices of the slave power line devices located in the non-broken section of the power line network through the wireless transmission device provided by the agent device, wherein the main power line device and each of the slave power line devices has a storage device configured to store a Received Signal Strength Indicator (RSSI) table to record RSSI values between the power line devices, wherein the processor classifies the slave power line devices into different groups according to the RSSI table, wherein each of the groups has a corresponding priority, wherein when the section of the power line network is broken, the processor selects the slave power line device comprised in the group having the highest priority and the largest RSSI value to be the agent device from the slave power line devices located in the broken section.

7. The power line transmission system of claim 6, wherein the processor determines whether the RSSI value between the slave power line device and the main power line device is larger than a threshold, wherein when the RSSI value is larger than the threshold, the processor classifies the slave power line device to the group having a first priority.

8. The power line transmission system of claim 7, wherein the processor further determines whether the RSSI value between the slave power line device not classified and the slave power line device comprised in the group having the first priority is larger than the threshold, wherein when the RSSI value is larger than the threshold, the processor classifies the slave power line device not classified to the group having a second priority.

9. The power line transmission system of claim 8, wherein when selecting the agent device, the processor excludes the slave power line device having RSSI values in the RSSI table smaller than the threshold to be the agent device.

10. The power line transmission system of claim 6, wherein when the broken section of the power line network is recovered, the processor terminates a wireless network function provided by the wireless transmission device of the agent device and returns to use the power line network device.

11. A power line transmission system applicable to a power line network, comprising:
a main power line device configured to connect to a cable network; and
a plurality of slave power line devices configured to receive the power line network provided by the main power line device, wherein the main power line device and each of the slave power line devices comprises a wireless transmission device, a processor, and a power line network device, wherein the power line network device is configured to receive the power line network and when a section of the power line network is broken, the processor is configured to select an agent device from the slave power line devices located in the broken section, and the slave power line devices located in the broken section maintain the power line network to operate normally by the wireless transmission devices of the slave power line devices located in the non-broken section of the power line network through the wireless transmission device provided by the agent device, wherein the main power line device and each of the slave power line devices has a storage device configured to store a Received Signal Strength Indicator (RSSI) table to record RSSI values between the power line devices, wherein the processor classifies the slave power line devices into different groups according to the RSSI table, wherein each of the groups has a corresponding priority, wherein the processor determines whether the RSSI value between the slave power line device and the main power line device is larger than a threshold, wherein when the RSSI value is larger than the threshold, the processor classifies the slave power line device to the group having a first priority.

12. The power line transmission system of claim 11, wherein the processor further determines whether the RSSI value between the slave power line device not classified and the slave power line device comprised in the group having the first priority is larger than the threshold, wherein when the RSSI value is larger than the threshold, the processor classifies the slave power line device not classified to the group having a second priority.

13. The power line transmission system of claim 12, wherein when selecting the agent device, the processor excludes the slave power line device having RSSI values in the RSSI table smaller than the threshold to be the agent device.

14. The power line transmission system of claim 11, wherein when the broken section of the power line network is recovered, the processor terminates a wireless network function provided by the wireless transmission device of the agent device and returns to use the power line network device.

* * * * *